United States Patent
Weerasooriya et al.

(10) Patent No.: US 7,839,591 B1
(45) Date of Patent: Nov. 23, 2010

(54) DISK DRIVE COMPRISING INDEX SPIRAL TRACK IDENTIFIED BY CHANGE IN SYNC MARK

(75) Inventors: Siri S. Weerasooriya, Campbell, CA (US); William W. Clawson, Fremont, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 402 days.

(21) Appl. No.: 12/028,974

(22) Filed: Feb. 11, 2008

(51) Int. Cl.
G11B 5/09 (2006.01)

(52) U.S. Cl. ..................................... 360/51

(58) Field of Classification Search .............. 360/51, 360/48, 75, 39
See application file for complete search history.

(56) References Cited

U.S. PATENT DOCUMENTS

| | | | |
|---|---|---|---|
| 5,293,565 A | 3/1994 | Jaquette et al. | |
| 5,668,679 A | 9/1997 | Swearingen et al. | |
| 6,091,564 A | 7/2000 | Codilian et al. | |
| 6,466,385 B1 | 10/2002 | Umeda et al. | |
| 6,504,664 B1 | 1/2003 | Zook | |
| 6,507,450 B1 | 1/2003 | Elliott | |
| 6,775,081 B2 | 8/2004 | Ottesen et al. | |
| 6,987,636 B1 * | 1/2006 | Chue et al. ............... | 360/75 |
| 6,992,848 B1 | 1/2006 | Agarwal et al. | |
| 6,992,852 B1 | 1/2006 | Ying et al. | |
| 7,016,134 B1 | 3/2006 | Agarwal et al. | |
| 7,145,744 B1 | 12/2006 | Clawson et al. | |
| 7,391,584 B1 * | 6/2008 | Sheh et al. ............... | 360/51 |
| 7,433,143 B1 * | 10/2008 | Ying et al. ............... | 360/51 |
| 7,457,071 B1 * | 11/2008 | Sheh ....................... | 360/75 |
| 7,561,359 B1 * | 7/2009 | Jeong et al. ............. | 360/48 |
| 2003/0035239 A1 | 2/2003 | Ottesen et al. | |
| 2006/0103967 A1 | 5/2006 | Kim et al. | |
| 2006/0171059 A1 | 8/2006 | Chan et al. | |
| 2007/0211367 A1 | 9/2007 | Lau et al. | |
| 2008/0180826 A1 * | 7/2008 | Cho ......................... | 360/48 |

OTHER PUBLICATIONS

US 6,906,885, 06/2005, Agarwal et al. (withdrawn)

* cited by examiner

*Primary Examiner*—Fred Tzeng

(57) ABSTRACT

A disk drive is disclosed comprising a disk and a head actuated over the disk. The disk comprises a plurality of spiral tracks, wherein each spiral track comprises a high frequency signal interrupted by a sync mark at a sync mark interval. A first spiral track comprises a first sync mark from an outer diameter of the disk to a reference radial location and a second sync mark from the reference radial location toward an inner diameter of the disk. A second spiral track comprises the second sync mark from the outer diameter of the disk to the reference radial location and the first sync mark from the reference radial location toward the inner diameter of the disk. The first sync mark is different than the second sync mark.

25 Claims, 12 Drawing Sheets

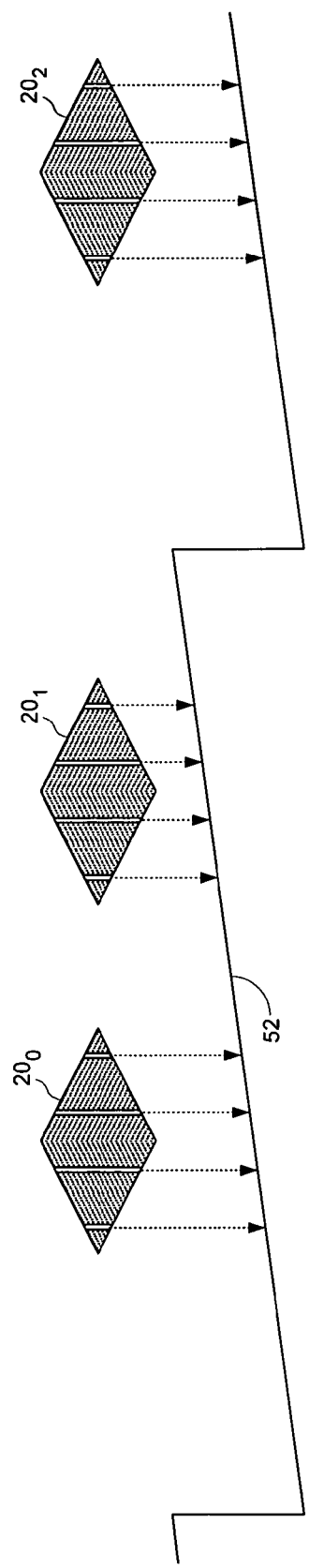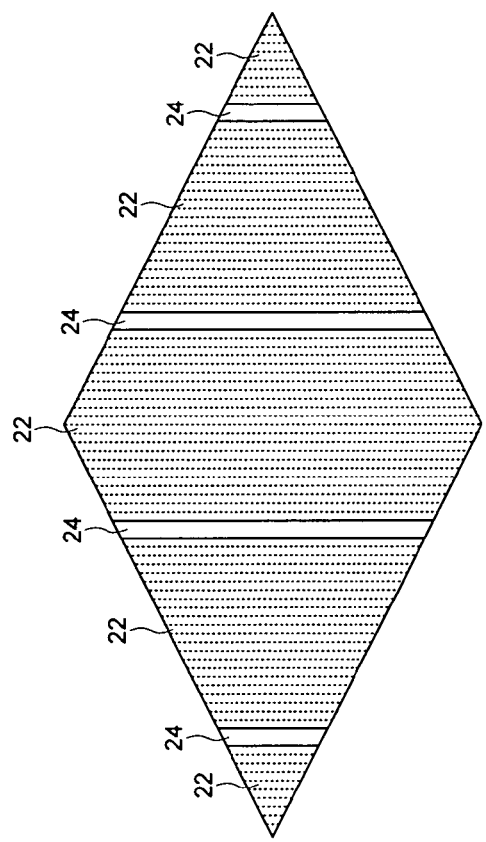

DISK DRIVE COMPRISING INDEX SPIRAL TRACK IDENTIFIED BY CHANGE IN SYNC MARK

BACKGROUND

When manufacturing a disk drive, servo sectors $2_0$-$2_N$ are written to a disk 4 which define a plurality of radially-spaced, concentric data tracks 6 as shown in the prior art disk format of FIG. 1. Each data track 6 is partitioned into a plurality of data sectors wherein the servo sectors $2_0$-$2_N$ are considered "embedded" in the data sectors. Each servo sector (e.g., servo sector $2_4$) comprises a preamble 8 for synchronizing gain control and timing recovery, a sync mark 10 for synchronizing to a data field 12 comprising coarse head positioning information such as a track number, and servo bursts 14 which provide fine head positioning information. The coarse head position information is processed to position a head over a target track during a seek operation, and the servo bursts 14 are processed to maintain the head over a centerline of the target track while writing or reading data during a tracking operation.

In the past, external servo writers have been used to write the product servo sectors $2_0$-$2_N$ to the disk surface during manufacturing. External servo writers employ extremely accurate head positioning mechanics, such as a laser interferometer, to ensure the product servo sectors $2_0$-$2_N$ are written at the proper radial location from the outer diameter of the disk to the inner diameter of the disk. However, external servo writers are expensive and require a clean room environment so that a head positioning pin can be inserted into the head disk assembly (HDA) without contaminating the disk. Thus, external servo writers have become an expensive bottleneck in the disk drive manufacturing process.

The prior art has suggested various "self-servo" writing methods wherein the internal electronics of the disk drive are used to write the product servo sectors independent of an external servo writer. For example, U.S. Pat. No. 5,668,679 teaches a disk drive which performs a self-servo writing operation by writing a plurality of spiral tracks to the disk which are then processed to write the product servo sectors along a circular path. Each spiral track is written to the disk as a high frequency signal (with missing bits), wherein the position error signal (PES) for tracking is generated relative to time shifts in the detected location of the spiral tracks. The read signal is rectified and low pass filtered to generate a triangular envelope signal representing a spiral track crossing, wherein the location of the spiral track is detected by detecting a peak in the triangular envelope signal relative to a clock synchronized to the rotation of the disk.

BRIEF DESCRIPTION OF THE DRAWINGS

FIG. 4A shows an embodiment of the present invention wherein a servo write clock is synchronized by clocking a modulo-N counter relative to when the sync marks in the spiral tracks are detected.

FIG. 4B shows an envelope generated by reading the spiral track, including the sync marks in the spiral track.

DETAILED DESCRIPTION OF EMBODIMENTS OF THE INVENTION

Figure 2A:
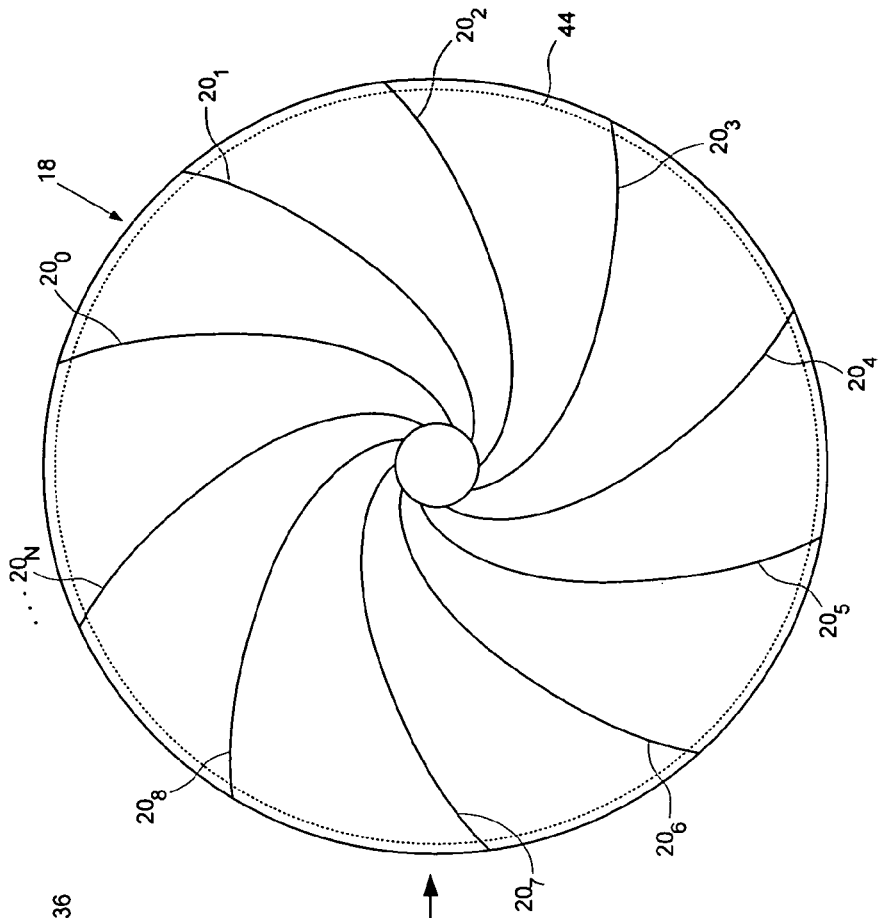
FIG. 2A shows an external spiral servo writer for writing spiral tracks to the disk according to an embodiment of the present invention.
Figure 6A:
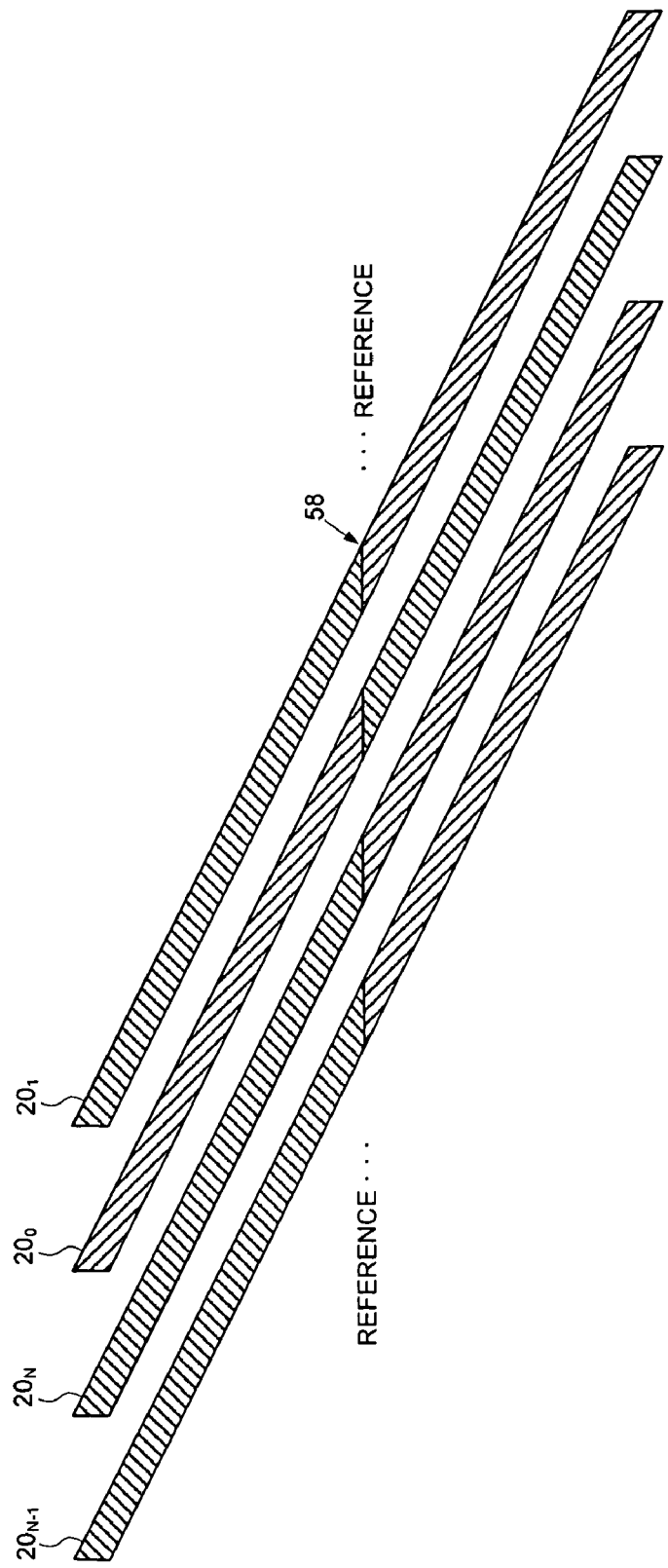
FIG. 6A shows an embodiment of the present invention wherein the plurality of spiral tracks comprises an index spiral track which has a sync mark different from the other spiral tracks, wherein the sync marks flip to define a reference radial location.

FIG. 2A shows an embodiment of the present invention wherein an external servo writer 36 is used to write a plurality of spiral tracks $20_0$-$20_N$ to a disk 18 of a disk drive 16. Each spiral track $20_i$ comprises a high frequency signal interrupted by a sync mark at a sync mark interval. FIG. 6A shows an embodiment of the present invention wherein a first spiral track $20_1$ comprises a first sync mark from an outer diameter of the disk 18 to a reference radial location 58 and a second sync mark from the reference radial 58 location toward an inner diameter of the disk 18. A second spiral track $20_0$ comprises the second sync mark from the outer diameter of the disk to the reference radial location 58 and the first sync mark from the reference radial location 58 toward the inner diameter of the disk 18. The first sync mark is different from the second sync mark such that when a head 28 is actuated radially over the disk 18, the reference radial location 58 can be located by detecting the first and second sync marks.

The disk drive 16 of FIG. 2A comprises control circuitry 34 and a head disk assembly (HDA) 32 comprising the disk 18, an actuator arm 26, the head 28 coupled to a distal end of the actuator arm 26, and a voice coil motor 30 for rotating the actuator arm 26 about a pivot to position the head 28 radially over the disk 18. In one embodiment, a write clock is synchronized to the rotation of the disk 18, and the plurality of spiral tracks $20_0$-$20_N$ are written on the disk 18 at a predetermined circular location determined from the write clock.

The spiral tracks $20_0$-$20_N$ may be written to the disk 18 using any suitable technique. In the embodiment of FIG. 2A, an entire disk drive 16 is inserted into an external spiral servo writer 36. In an alternative embodiment, only the HDA 32 of the disk drive is inserted into the external spiral servo writer 36. In yet another embodiment, an external media writer is used to write the spiral tracks $20_0$-$20_N$ to a number of disks 18, and one or more of the disks 18 are then inserted into an HDA 32. In yet another embodiment, the spiral tracks $20_0$-$20_N$ are stamped onto the disk 18 using magnetic printing techniques. In still another embodiment, the spiral tracks $20_0$-$20_N$ are self servo written to the disk 18 by the control circuitry 34 internal to the disk drive.

Referring again to the embodiment of FIG. 2A, the external spiral servo writer 36 comprises a head positioner 38 for actuating a head positioning pin 40 using sensitive positioning circuitry, such as a laser interferometer. While the head positioner 38 moves the head 28 at a predetermined velocity over the stroke of the actuator arm 26, pattern circuitry 42 generates the data sequence written to the disk 18 for a spiral track 20. The external spiral servo writer 36 inserts a clock head 46 into the HDA 32 for writing a clock track 44 (FIG. 2B) at an outer diameter of the disk 18. The clock head 46 then reads the clock track 44 to generate a clock signal 48 processed by timing recovery circuitry 50 to synchronize the write clock 51 for writing the spiral tracks $20_0$-$20_N$ to the disk 18. The timing recovery circuitry 50 enables the pattern circuitry 42 at the appropriate time relative to the write clock 51 so that the spiral tracks $20_0$-$20_N$ are written at the appropriate circular location. The timing recovery circuitry 50 also enables the pattern circuitry 42 relative to the write clock 51 to write the sync marks 24 (FIG. 4B) within the spiral tracks $20_0$-$20_N$ at the same circular location from the outer diameter to the inner diameter of the disk 18. As described below with reference to FIG. 5, the constant interval between sync marks 24 (independent of the radial location of the head 28) enables the servo write clock to maintain synchronization while writing the product servo sectors to the disk.

Figure 2B:
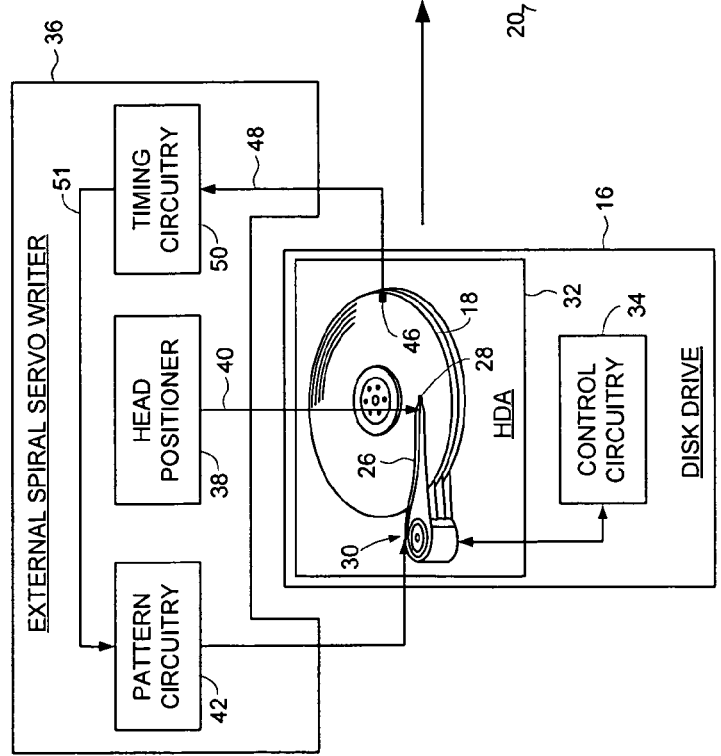
FIG. 2B shows spiral tracks written to the disk over a partial disk revolution according to an embodiment of the present invention.
Figure 3:
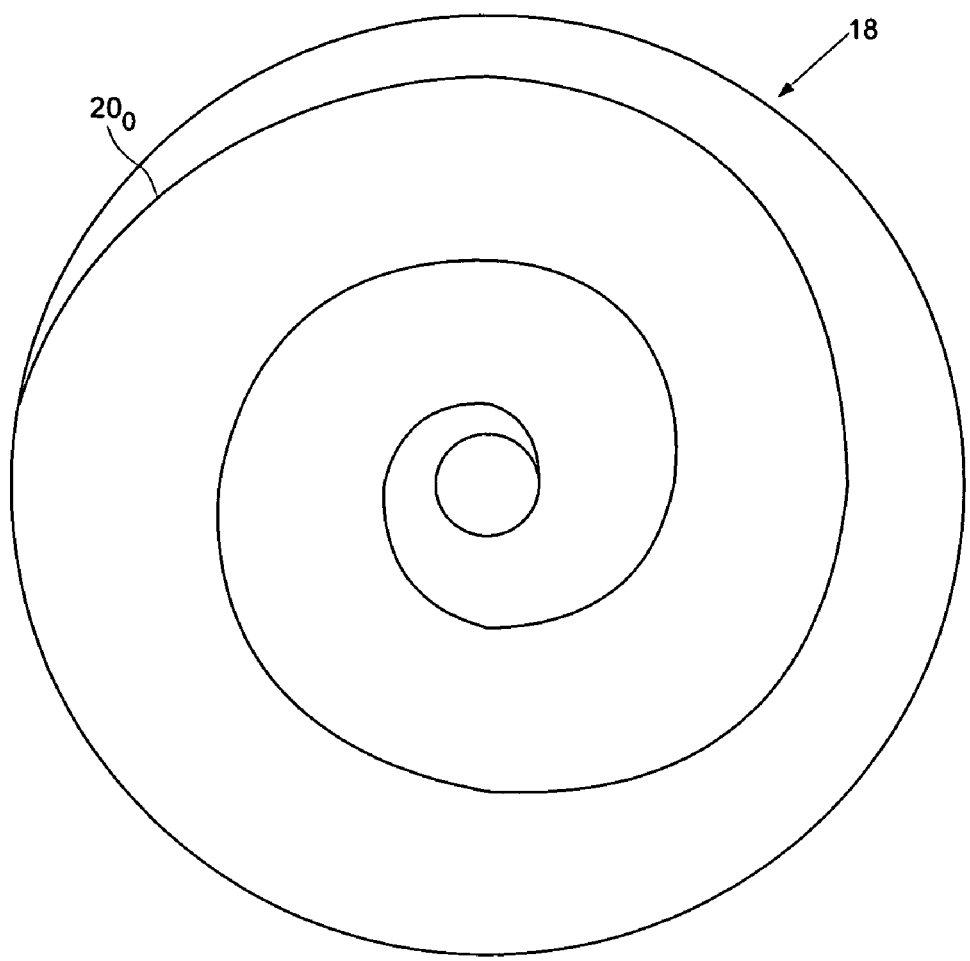
FIG. 3 illustrates an embodiment of the present invention wherein each spiral track is written over multiple revolutions of the disk.

In the embodiment of FIG. 2B, each spiral track $20_i$ is written over a partial revolution of the disk 18. In an alternative embodiment, each spiral track $20_i$ is written over one or more revolutions of the disk 18. FIG. 3 shows an embodiment wherein each spiral track $20_i$ is written over multiple revolutions of the disk 18.

Figure 10:
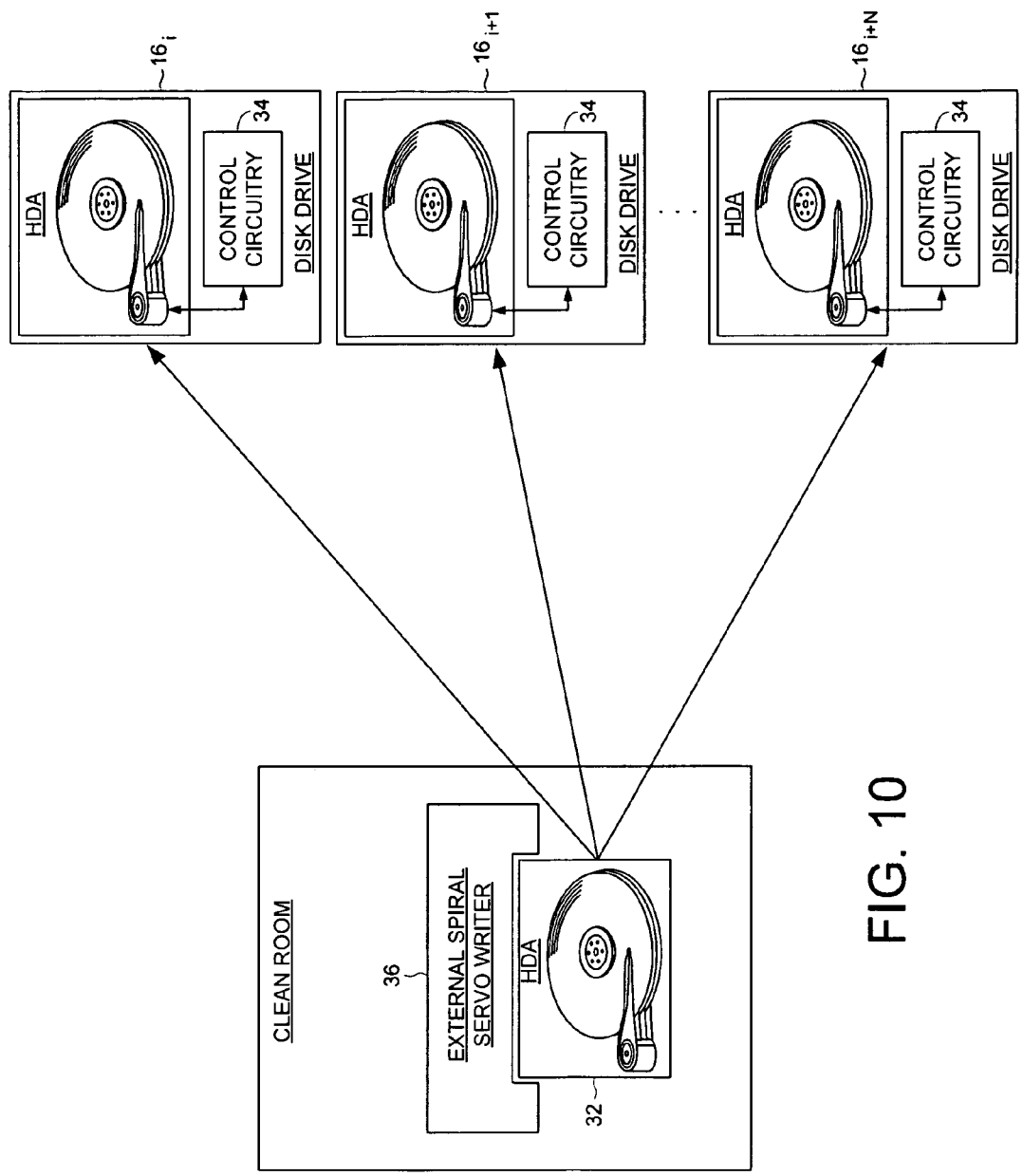
FIG. 10 shows an embodiment of the present invention wherein an external spiral servo writer is used to write the spiral tracks, and the control circuitry within each product disk drive is used to write the product servo sectors.

Referring again to the embodiment of FIG. 2A, after the external spiral servo writer 36 writes the spiral tracks $20_0$-$20_N$ to the disk 18, the head positioning pin 40 and clock head 46 are removed from the HDA 32 and the product servo sectors are written to the disk 18 during a "fill operation". In one embodiment, the control circuitry 34 within the disk drive 16 is used to process the spiral tracks $20_0$-$20_N$ in order to write the product servo sectors to the disk 18. In an alternative embodiment described below with reference to FIGS. 10 and 11, an external product servo writer is used to process the spiral tracks $20_0$-$20_N$ in order to write the product servo sectors to the disk 18.

FIG. 4B illustrates an envelope of the read signal that is generated when the head 28 passes over a spiral track 20. The read signal representing the spiral track comprises high frequency transitions 22 interrupted by sync marks 24. When the head 28 moves in the radial direction, the envelope will shift (left or right) while the sync marks 24 remain fixed. The shift in the envelope (detected from the high frequency signal 22) relative to the sync marks 24 provides the off-track information (position error signal or PES) for servoing the head 28.

FIG. 4A shows an embodiment of the present invention wherein a saw-tooth waveform 52 is generated by clocking a modulo-N counter with the servo write clock, wherein the frequency of the servo write clock is adjusted until the sync marks 24 in the spiral tracks $20_0$-$20_N$ are detected at a target modulo-N count value. The servo write clock may be generated using any suitable circuitry, such as a phase locked loop (PLL). As each sync mark 24 in the spiral tracks $20_0$-$20_N$ is detected, the value of the modulo-N counter represents the phase error for adjusting the PLL. In one embodiment, the PLL is updated when any one of the sync marks 24 within the eye pattern is detected. In this manner the multiple sync marks 24 in each eye pattern (each spiral track crossing) provides redundancy so that the PLL is still updated if one or more of the sync marks 24 are missed due to noise in the read signal. Once the sync marks 24 are detected at the target modulo-N counter values, the servo write clock is coarsely locked to the desired frequency for writing the product servo sectors to the disk 18.

Figure 1:
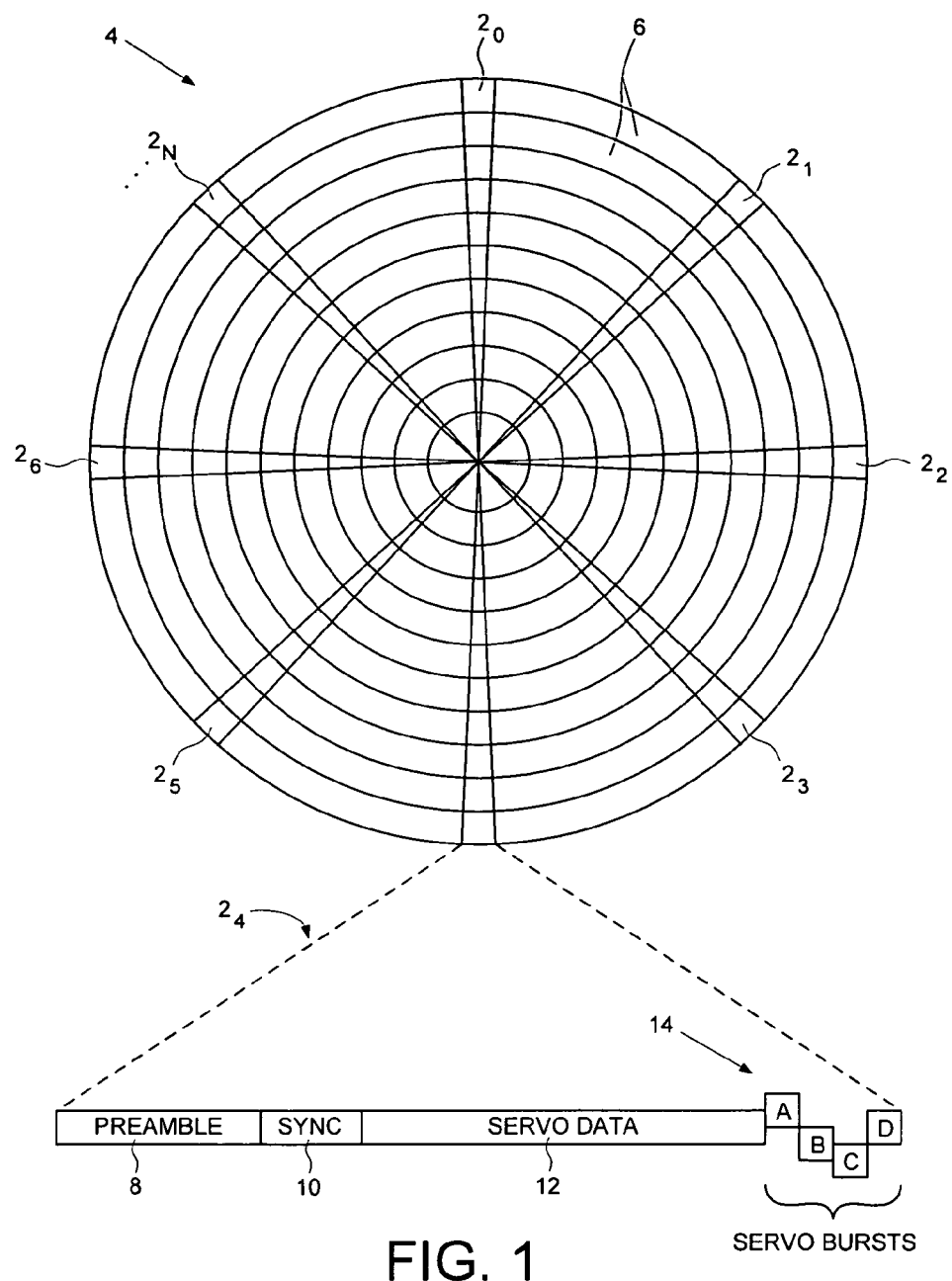
FIG. 1 shows a prior art disk format comprising a plurality of data tracks defined by a plurality of servo sectors.

The sync marks 24 in the spiral tracks $20_0$-$20_N$ may comprise any suitable pattern, and in one embodiment, a pattern that is substantially shorter than the sync mark 10 in the conventional product servo sectors 2 of FIG. 1. A shorter sync mark 24 may allow the spiral tracks $20_0$-$20_N$ to be written to the disk 18 using a steeper slope (by moving the head faster from the outer diameter to the inner diameter of the disk 18), which may reduce the time required to write each spiral track $20_0$-$20_N$.

In one embodiment, the servo write clock is further synchronized by generating a timing recovery measurement from the high frequency signal 22 between the sync marks 24 in the spiral tracks $20_0$-$20_N$. Synchronizing the servo write clock to the high frequency signal 22 helps maintain proper radial alignment (phase coherency) of the Gray coded track addresses in the product servo sectors. The timing recovery measurement may be generated in any suitable manner. In one embodiment, the servo write clock is used to sample the high frequency signal 22 and the signal sample values are processed to generate the timing recovery measurement. The timing recovery measurement adjusts the phase of the servo write clock (PLL) so that the high frequency signal 22 is sampled synchronously. In this manner, the sync marks 24 provide a coarse timing recovery measurement and the high frequency signal 22 provides a fine timing recovery measurement for maintaining synchronization of the servo write clock.

Figure 5:
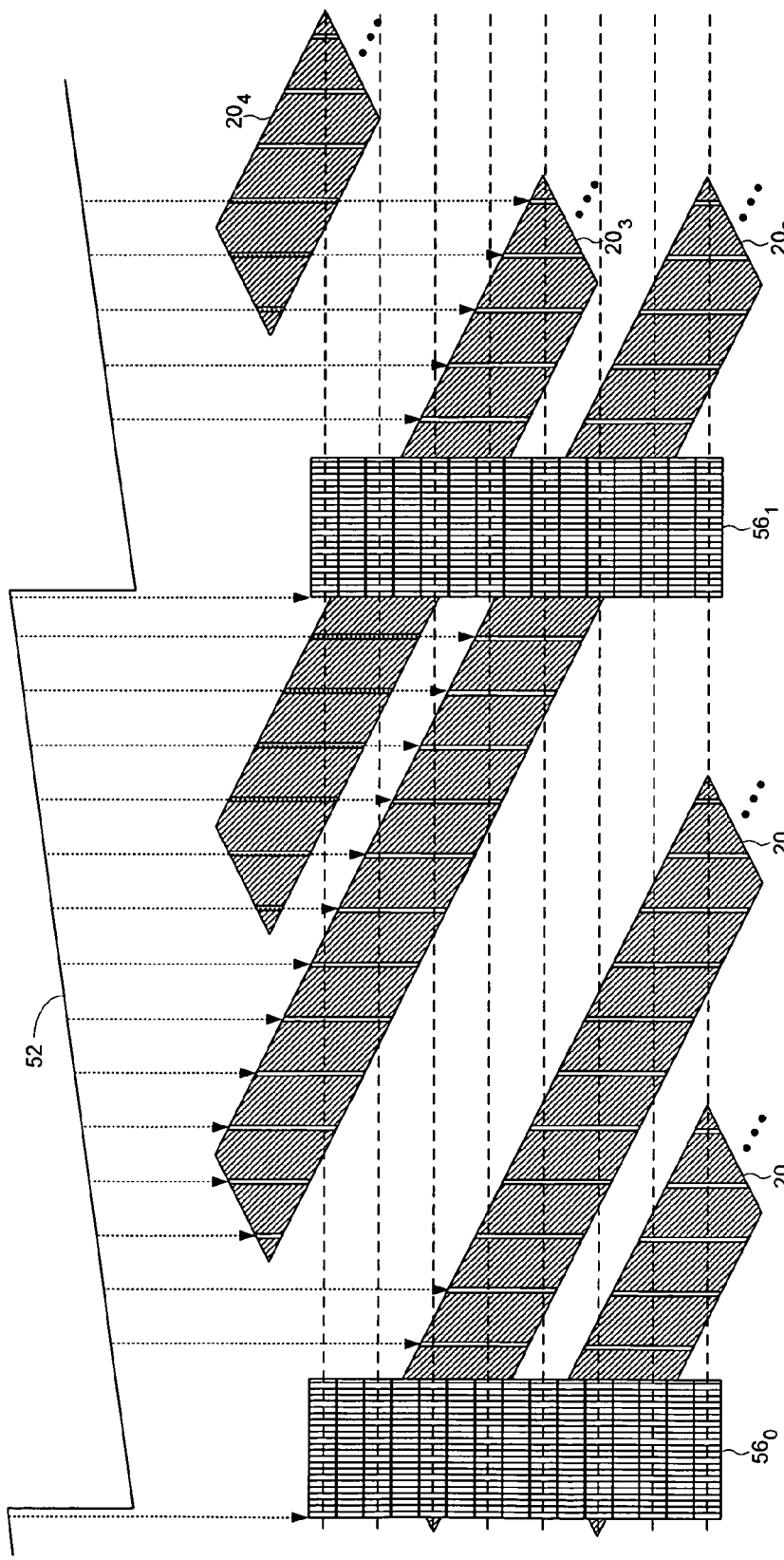
FIG. 5 illustrates writing of product servo sectors using a servo write clock generated from reading the spiral tracks.

FIG. 5 illustrates how the product servo sectors $56_0$-$56_N$ are written to the disk 18 after synchronizing the servo write clock in response to the high frequency signal 22 and the sync marks 24 in the spiral tracks $20_0$-$20_N$. In the embodiment of FIG. 5, the dashed lines represent the centerlines of the data tracks. The sync marks in the spiral tracks $20_0$-$20_N$ may be written so that there is a shift of two sync marks 24 in the envelope (FIG. 4B) between data tracks. In an alternative embodiment, the sync marks 24 in the spiral tracks $20_0$-$20_N$ are written so that there is a shift of N sync marks in the envelope between data tracks. In the embodiment of FIG. 5, the data tracks are narrower than the spiral tracks 20, however, in an alternative embodiment the data tracks are wider than or proximate the width of the spiral tracks 20.

Once the head 28 is tracking on a servo track, the product servo sectors $56_0$-$56_N$ are written to the disk using the servo write clock. Write circuitry is enabled when the modulo-N counter reaches a predetermined value, wherein the servo write clock clocks the write circuitry to write the product servo sector 56 to the disk. The spiral tracks $20_0$-$20_N$ on the disk are processed in an interleaved manner to account for the product servo sectors $56_0$-$56_N$ overwriting a spiral track. For example, when writing the product servo sectors $56_1$ to the disk, spiral track $20_2$ is processed initially to generate the PES tracking error and the timing recovery measurement. When the product servo sectors $56_1$ begin to overwrite spiral track $20_2$, spiral track $20_3$ is processed to generate the PES tracking error and the timing recovery measurement. In the embodiment of FIG. 5, the spiral tracks 20 are written as pairs to facilitate the interleave processing; however, the spiral tracks may be written using any suitable spacing (e.g., equal spacing) while still implementing the interleaving aspect. In other embodiments, the disk comprises only one set of spiral tracks $20_0$-$20_N$ all of which are processed to servo the head (except the spiral track being overwritten).

In one embodiment, prior to writing the product servo sectors $56_0$-$56_N$ to the disk 18, the circumferential location of head 28 relative to the disk 18 as well as the radial location of the head 28 relative to the disk 18 is determined so that the servo writing process can be initialized. Referring to FIG. 6A, in one embodiment one of the spiral tracks (e.g., spiral track $20_0$) is designated as an index spiral track by recording sync marks 24 (FIG. 4B) that are different from the sync marks 24 in the other spiral tracks. When the different sync mark is detected, the index spiral track is detected. At a reference radial location 58 along the radius of the disk 18, the sync marks 24 in the index spiral track $20_0$ flips with the sync marks 24 of the other spiral tracks. The reference radial location 58 is located by detecting the flip in the sync marks 24, and once the reference radial location 58 is located, the radial location of the head 28 is known and the circumferential location of the head 28 can be determined relative to the index spiral track $20_0$. The head 28 is then servoed off of the spiral tracks $20_0$-$20_N$ to an initial radial location (e.g., near the outer diameter of the disk) in order to start (or restart) the process of writing the product servo sectors $56_0$-$56_N$.

Any suitable sync marks 24 may be employed in the embodiments of the present invention. In one embodiment, a first sync mark comprises a first sequence of magnetic transitions, and a second sync mark comprises a different sequence of magnetic transitions. Referring to FIG. 6A, the spiral tracks $20_1$, $20_{N-1}$ and $20_N$ comprise the first sync mark from an outer diameter of the disk 18 toward the reference radial location 58, and then comprise the second sync mark from the reference radial location 58 toward an inner diameter of the disk 18. Conversely, the index spiral track $20_0$ comprises the second sync mark from the outer diameter of the disk 18 toward the reference radial location 58, and then comprise the first sync mark from the reference radial location 58 toward the inner diameter of the disk 18. Therefore, the sync marks 24 may be said to "flip" at the reference radial location 58, and this flip in sync marks identifies the reference radial location 58.

Figure 6B:
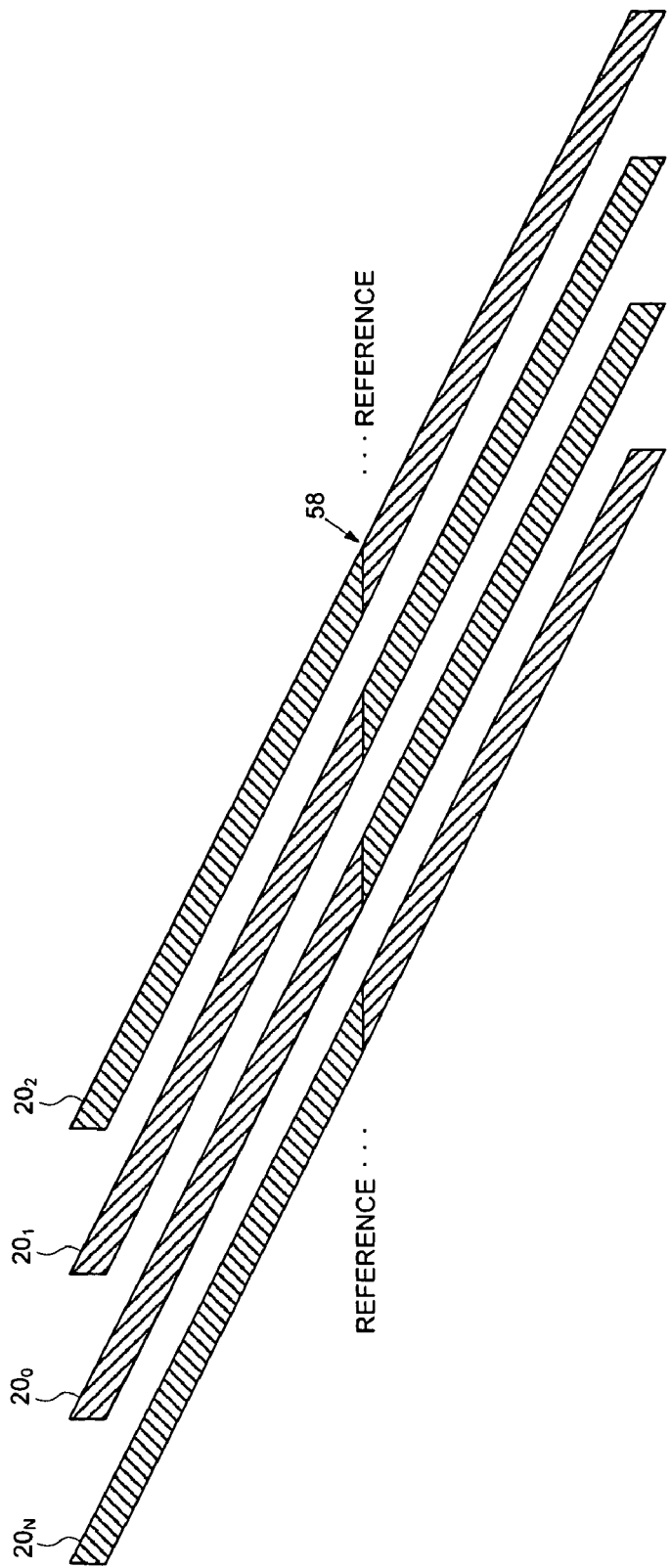
FIG. 6B shows an embodiment of the present invention wherein the plurality of spiral tracks comprises two interleaves, wherein each interleave comprises an index spiral track.

FIG. 6B shows an embodiment of the present invention wherein the spiral tracks $20_0$-$20_N$ comprise two interleaves of spiral tracks (e.g., an even interleave and an odd interleave), wherein each interleave comprises an index spiral track (e.g., spiral tracks $20_0$ and $20_1$). Each index spiral track comprises a sync mark 24 that is different from the other spiral tracks of the corresponding interleave, similar to FIG. 6A. When the reference radial location 58 is located relative to the sync marks 24, the circumferential location of the head 28 relative to the disk 18 is determined for each interleave. The reference radial location 58 and reference circumferential locations for each interleave are then used to write the product servo sectors $56_0$-$56_N$ to the disk 18. In one embodiment, the index spiral tracks (e.g., spiral tracks $20_0$ and $20_1$) are written adjacent one another in order to minimize the circumferential offset between the index spiral tracks due, for example, to thermal expansion of the disk 18 when writing the spiral tracks.

Figure 6C:
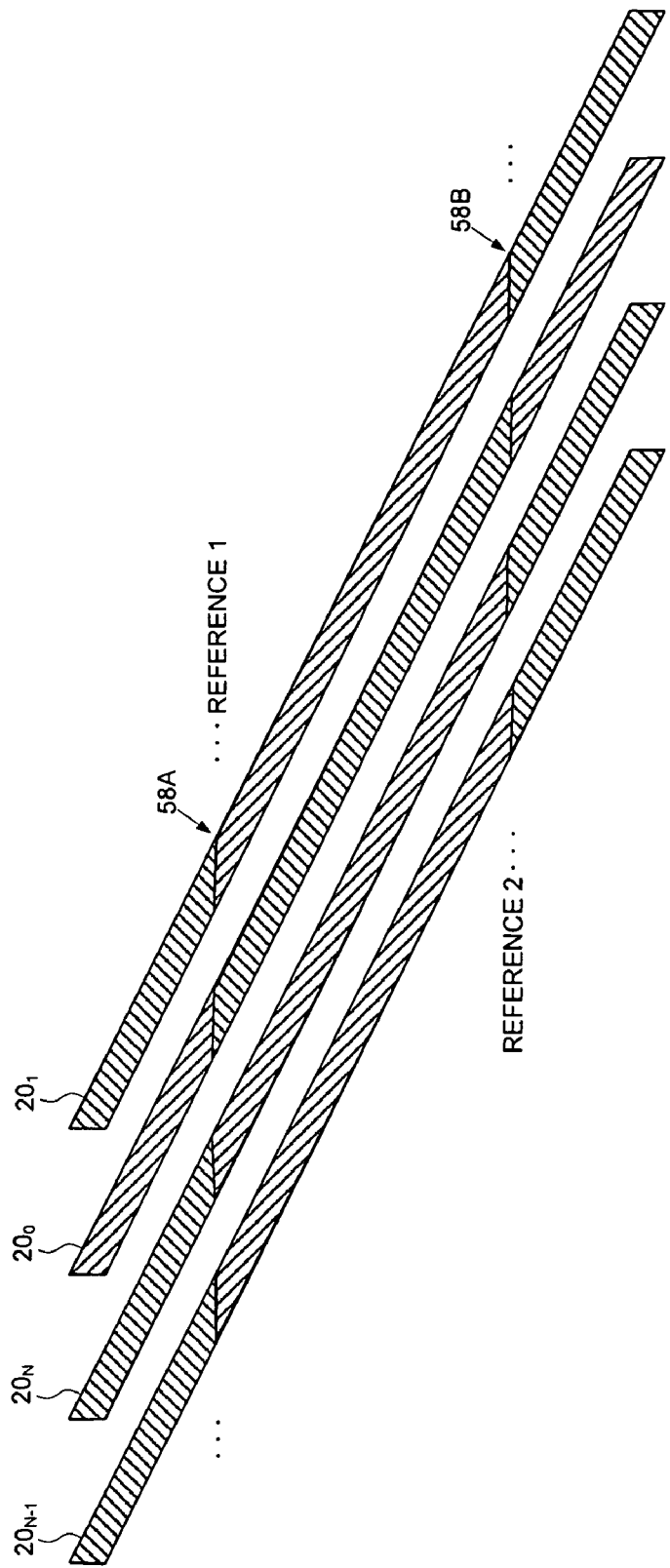
FIG. 6C shows an embodiment of the present invention wherein the sync marks flip at multiple radial locations to define multiple reference locations.

FIG. 6C shows an embodiment of the present invention wherein flipping the sync marks 24 defines multiple reference radial locations. In the example of FIG. 6C, a first reference radial location 58A is defined toward an outer diameter of the disk 18, and a second radial location 58B is defined toward an inner diameter of the disk 18. Both reference radial locations are defined by flipping the sync marks in the index spiral track $20_0$ relative to the other spiral tracks. Defining multiple reference radial locations may be useful, for example, to verify the integrity of the servo writing process.

Figure 7A:
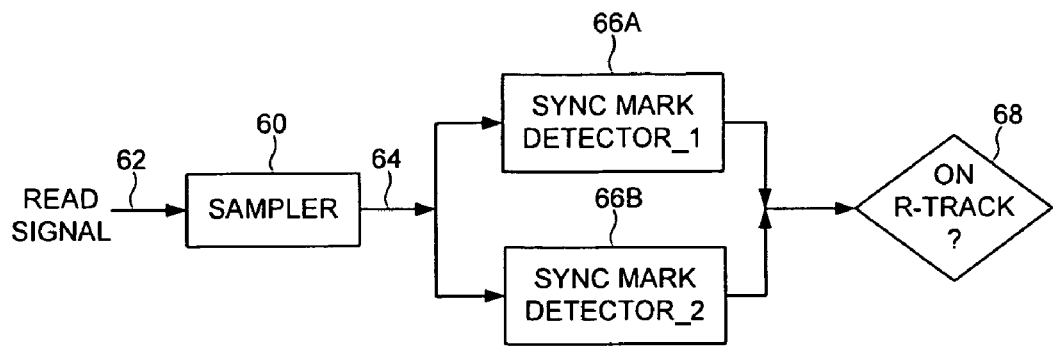
FIG. 7A shows an embodiment of the present invention wherein first and second sync mark detectors detect respective sync marks for the index spiral track and the other spiral tracks.

FIG. 7A shows control circuitry according to an embodiment of the present invention comprising a sampler 60 for sampling a read signal 62 emanating from the head 28 to generate read signal samples 64. The read signal samples 64 are then processed by a first sync mark detector 66A for detecting the first sync mark 24 described above, and a second sync mark detector 66B for detecting the second sync mark 24 described above. The sync mark detectors 66A and 66B may be implemented in any suitable manner, such as using suitable correlators which correlate a target pattern with the read signal samples 64. The read signal samples 64 may be processed by the sync mark detectors 66A and 66B as raw sample values (multi-bit discrete-time values), or as a binary sequence detected from the raw sample values. The outputs of the sync mark detectors 66A and 66B are evaluated by suitable circuitry 68 to detect the flip in the sync marks 24 which identifies the reference radial location 58.

Figure 7B:
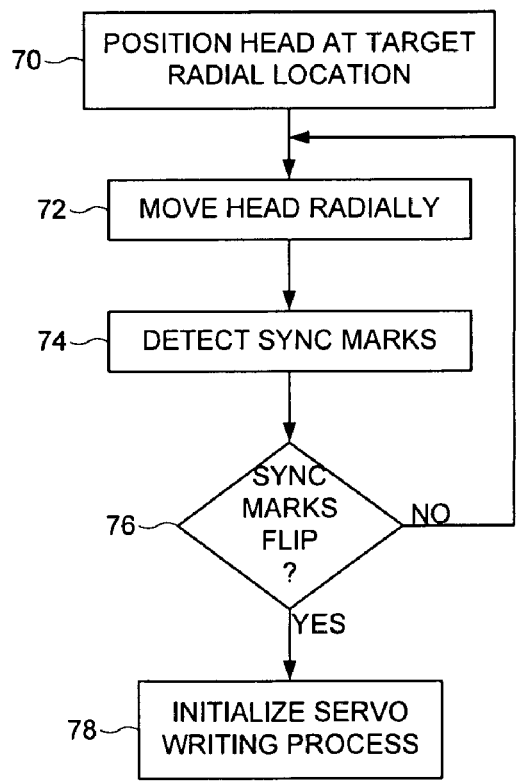
FIG. 7B is a flow diagram according to an embodiment of the present invention wherein the reference radial location is located by moving the head radially over the disk until the sync marks flip.

FIG. 7B is a flow diagram according to an embodiment of the present invention for locating the reference radial location. The head is positioned at a target radial location (step 70), for example, at an outer diameter of the disk by rotating the actuator arm 26 until it contacts a crash stop. The head is then moved radially over the disk (step 72), for example, toward the inner diameter of the disk. The sync marks in the spiral tracks are detected (step 74), and when the sync marks in the index spiral track and the other spiral tracks flip (step 76), the reference radial location is located. In one embodiment, the servo writing process is then initialized (step 78), for example, by moving the head to an initial radial location to start (or restart) the servo writing process.

In one embodiment, certain aspects of the spiral tracks are calibrated, such as repeatable runout in the radial direction as well as repeatable runout in the timing error for synchronizing a PLL to the spiral tracks. In one embodiment, the reference radial location 58 or locations 58A and 58B are used to verify the accuracy of the calibration processes.

In the embodiment described above with reference to FIG. 5 the spiral tracks are demodulated in order to write product servo sectors $56_0$-$56_N$ to the disk. During normal operation of the disk drive, the control circuitry 34 demodulates the product servo sectors $56_0$-$56_N$ to generate the PES used to servo the head during write and read operations. In an alternative embodiment, the control circuitry 34 demodulates the spiral tracks in order to generate the PES for servoing the head during write and read operations. For example, product servo sectors $56_0$-$56_N$ may be written to the disk by servoing off of the spiral tracks as described above with reference to FIG. 5 except that the servo bursts 14 may be omitted from the product servo sectors. When the control circuitry 34 demodulates the product servo sectors $56_0$-$56_N$ during normal operation, the residual spiral tracks may also be demodulated in order to generate the fine position information similar to using servo bursts 14.

Figure 8:
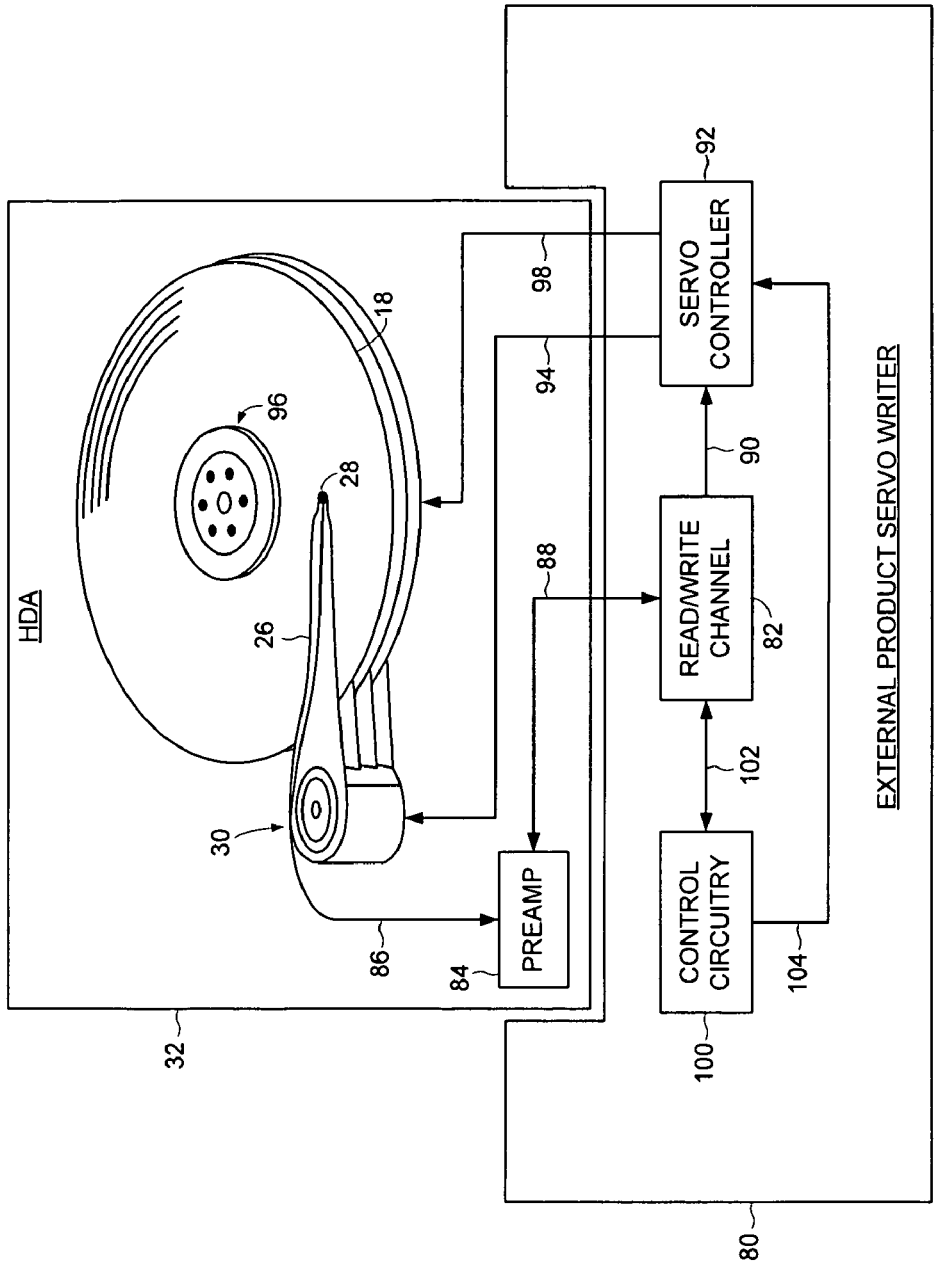
FIG. 8 shows an embodiment of the present invention wherein an external product servo writer is used to process the spiral tracks in order to write product servo sectors to the disk.

FIG. 8 shows an embodiment of the present invention wherein after writing the spiral tracks $20_0$-$20_N$ to the disk 18 (FIGS. 2A-2B), the HDA 32 is inserted into an external product servo writer 80 comprising suitable circuitry for reading and processing the spiral tracks $20_0$-$20_N$ in order to write the product servo sectors $56_0$-$56_N$ to the disk 18. The external product servo writer 80 comprises a read/write channel 82 for interfacing with a preamp 84 in the HDA 32. The preamp 84 amplifies a read signal emanating from the head 28 over line 86 to generate an amplified read signal applied to the read/write channel 82 over line 88. The read/write channel 82 comprises circuitry for generating servo burst signals 90 applied to a servo controller 92. The servo controller 92 processes the servo burst signals 90 to generate the PES. The PES is processed to generate a VCM control signal applied to the VCM 30 over line 94 in order to maintain the head 28 along a circular path while writing the product servo sectors $56_0$-$56_N$. The servo controller 92 also generates a spindle motor control signal applied to a spindle motor 96 over line 98 to maintain the disk 18 at a desired angular velocity. Control circuitry 100 processes information received from the read/write channel 32 over line 102 associated with the spiral tracks $20_0$-$20_N$ (e.g., timing information) and provides the product servo sector data to the read/write channel 82 at the appropriate time. The product servo sector data is provided to the preamp 84 which modulates a current in the head 28 in order to write the product servo sectors $56_0$-$56_N$ to the disk 18. The control circuitry 100 also transmits control information over line 104 to the servo controller 92 such as the target servo track to be written. After writing the product servo sectors $56_0$-$56_N$ to the disk 18, the HDA 32 is removed from the external product servo writer 80 and a printed circuit board assembly (PCBA) comprising the control circuitry 34 (FIG. 2A) is mounted to the HDA 32.

Figure 9:
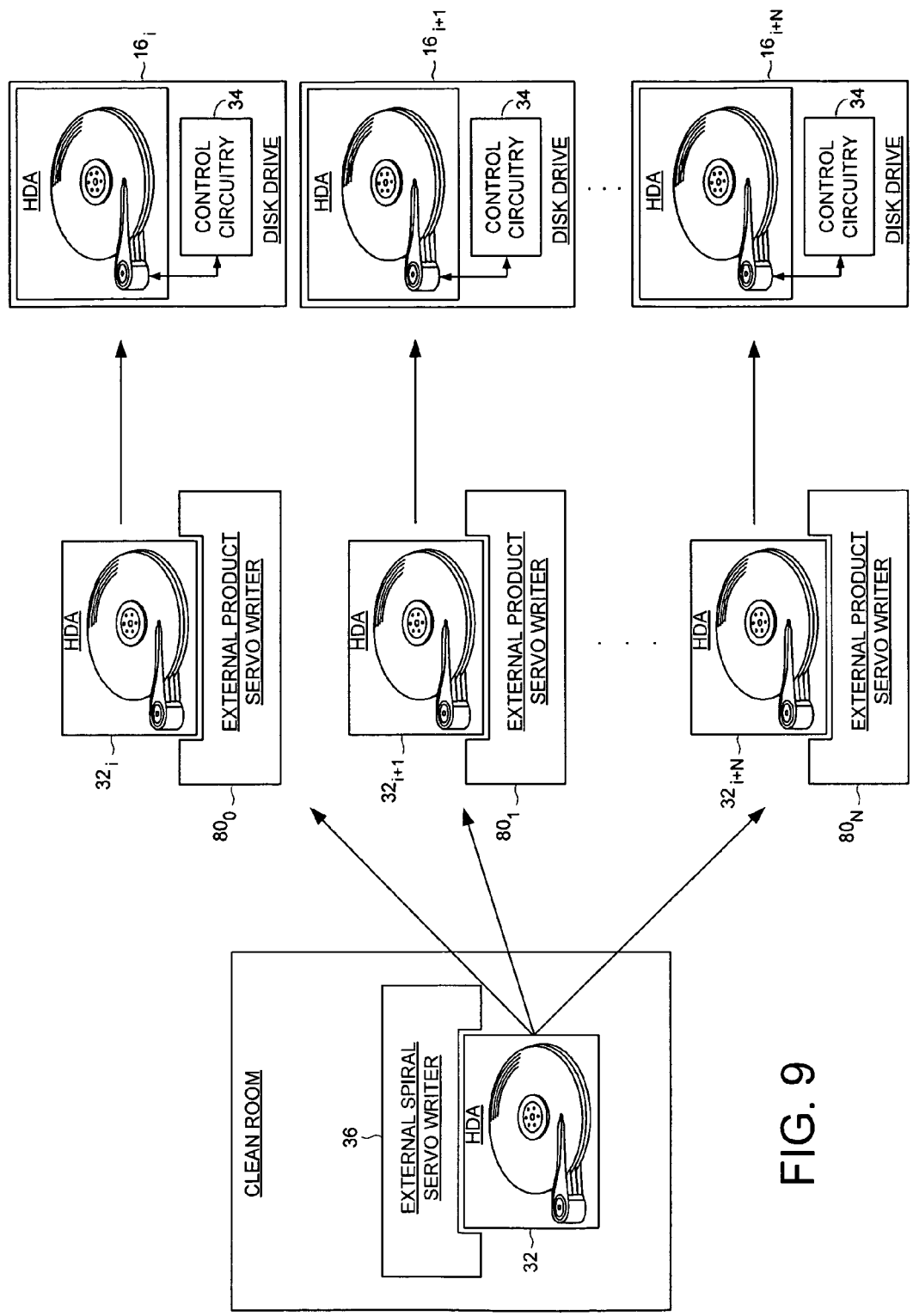
FIG. 9 shows an embodiment of the present invention wherein an external spiral servo writer is used to write the spiral tracks, and a plurality of external product servo writers write the product servo sectors for the HDAs output by the external spiral servo writer.

In one embodiment, the external product servo writer 80 of FIG. 8 interfaces with the HDA 32 over the same connections as the control circuitry 34 to minimize the modifications needed to facilitate the external product servo writer 80. The external product servo writer 80 is less expensive than a conventional servo writer because it does not require a clean room or sophisticated head positioning mechanics. In an embodiment shown in FIG. 9, a plurality of external product servo writers $80_0$-$80_N$ process the HDAs $32_i$-$32_{i+N}$ output by an external spiral servo writer 36 in order to write the product servo sectors less expensively and more efficiently than a conventional servo writer. In an alternative embodiment shown in FIG. 10, an external spiral servo writer 36 is used to write the spiral tracks, and the control circuitry 34 within each product disk drive $16_i$-$16_{i+N}$ is used to write the product servo sectors.

Any suitable control circuitry may be employed to implement the flow diagrams in the embodiments of the present invention, such as any suitable integrated circuit or circuits, which may include a microprocessor executing the steps of a control program. In the embodiment where the control circuitry 34 is implemented within a disk drive, it may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry 34 comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk 18 and read into a volatile semiconductor memory when the disk drive is powered on. In yet another embodiment, the control circuitry 34 comprises suitable logic circuitry, such as state machine circuitry.

What is claimed is:

1. A disk drive comprising:
   a disk comprising a plurality of spiral tracks, wherein:
      each spiral track comprises a high frequency signal interrupted by a sync mark at a sync mark interval;
      a first spiral track comprises a first sync mark from an outer diameter of the disk to a reference radial location and a second sync mark from the reference radial location toward an inner diameter of the disk;
      a second spiral track comprises the second sync mark from the outer diameter of the disk to the reference radial location and the first sync mark from the reference radial location toward the inner diameter of the disk; and
      the first sync mark is different than the second sync mark;
   a head actuated over the disk; and
   control circuitry operable to locate the reference radial location by detecting the first and second sync marks.

2. The disk drive as recited in claim 1, wherein:
   the remainder of the plurality of spiral tracks comprise the first sync mark from the outer diameter of the disk to the reference radial location and the second sync mark from the reference radial location to an inner diameter of the disk.

3. The disk drive as recited in claim 1, wherein the second spiral track is an index spiral track.

4. The disk drive as recited in claim 1, wherein:
   the spiral tracks comprise a first interleave of spiral tracks and a second interleave of spiral tracks;
   the first interleave of spiral tracks comprises the second spiral track; and
   the second interleave of spiral tracks comprises a third spiral track, wherein the third spiral track comprises the second sync mark from the outer diameter of the disk to the reference radial location, and the first sync mark from the reference radial location to the inner diameter of the disk.

5. The disk drive as recited in claim 4, wherein the second and third spiral tracks are an index spiral tracks.

6. The disk drive as recited in claim 4, wherein the second and third spiral tracks are adjacent spiral tracks.

7. The disk drive as recited in claim 1, wherein the control circuitry comprises:
   a first sync mark detector for detecting the first sync mark; and
   a second sync mark detector for detecting the second sync mark.

8. The disk drive as recited in claim 7, wherein the control circuitry locates the reference radial location by:
   positioning the head at a target radially location;
   moving the head radially over the disk; and evaluating an output of the first sync mark detector and an output of the second sync mark detector.

9. The disk drive as recited in claim 1, wherein the control circuitry is operable to:
use the head internal to the disk drive to read the spiral tracks to generate a read signal;
process the read signal representing the high frequency signal in the spiral tracks to generate a position error signal used to maintain the head along a substantially circular target path; and
use the head to write product servo sectors along the circular target path.

10. The disk drive as recited in claim 9, wherein the control circuitry is further operable to locate the reference radial location prior to writing the product servo sectors to the disk.

11. The disk drive as recited in claim 1, wherein:
the first spiral track comprises the second sync mark from the reference radial location to a second reference radial location and a third sync mark from the second reference radial location towards the inner diameter of the disk; and
the second spiral track comprises the first sync mark from the reference radial location to a second reference radial location and a fourth sync mark from the second reference radial location towards the inner diameter of the disk.

12. The disk drive as recited in claim 11, wherein the third sync mark is the same as the first sync mark and the fourth sync mark is the same as the second sync mark.

13. A method of detecting a reference radial location on a disk of a disk drive, the disk drive comprising:
a disk comprising a plurality of spiral tracks, wherein:
each spiral track comprises a high frequency signal interrupted by a sync mark at a sync mark interval;
a first spiral track comprises a first sync mark from an outer diameter of the disk to the reference radial location and a second sync mark from the reference radial location toward an inner diameter of the disk;
a second spiral track comprises the second sync mark from the outer diameter of the disk to the reference radial location and the first sync mark from the reference radial location toward the inner diameter of the disk; and
the first sync mark is different than the second sync mark; and
a head actuated over the disk,
the method comprising locating the reference radial location by detecting the first and second sync marks.

14. The method as recited in claim 13, wherein:
the remainder of the plurality of spiral tracks comprise the first sync mark from the outer diameter of the disk to the reference radial location and the second sync mark from the reference radial location to an inner diameter of the disk.

15. The method as recited in claim 13, wherein the second spiral track is an index spiral track.

16. The method as recited in claim 13, wherein:
the spiral tracks comprise a first interleave of spiral tracks and a second interleave of spiral tracks;
the first interleave of spiral tracks comprises the second spiral track; and
the second interleave of spiral tracks comprises a third spiral track, wherein the third spiral track comprises the second sync mark from the outer diameter of the disk to the reference radial location, and the first sync mark from the reference radial location to the inner diameter of the disk.

17. The method as recited in claim 16, wherein the second and third spiral tracks are an index spiral tracks.

18. The method as recited in claim 16, wherein the second and third spiral tracks are adjacent spiral tracks.

19. The method as recited in claim 13, wherein locating the reference radial location comprises:
detecting the first sync mark with a first sync mark detector; and
detecting the second sync mark with a second sync mark detector.

20. The method as recited in claim 19, wherein locating the reference radial location comprises:
positioning the head at a target radially location;
moving the head radially over the disk; and
evaluating an output of the first sync mark detector and an output of the second sync mark detector.

21. The method as recited in claim 13, further comprising:
using the head internal to the disk drive to read the spiral tracks to generate a read signal;
processing the read signal representing the high frequency signal in the spiral tracks to generate a position error signal used to maintain the head along a substantially circular target path; and
using the head to write product servo sectors along the circular target path.

22. The method as recited in claim 21, further comprising locating the reference radial location prior to writing the product servo sectors to the disk.

23. The method as recited in claim 13, further comprising locating a second reference radial location by detecting a third and fourth sync mark, wherein:
the first spiral track comprises the second sync mark from the reference radial location to the second reference radial location and the third sync mark from the second reference radial location towards the inner diameter of the disk; and
the second spiral track comprises the first sync mark from the reference radial location to a second reference radial location and the fourth sync mark from the second reference radial location towards the inner diameter of the disk.

24. The method as recited in claim 23, wherein the third sync mark is the same as the first sync mark and the fourth sync mark is the same as the second sync mark.

25. A disk drive comprising:
a disk comprising a plurality of spiral tracks, wherein:
each spiral track comprises a high frequency signal interrupted by a sync mark at a sync mark interval;
a first spiral track comprises a first sync mark from an outer diameter of the disk to a reference radial location and a second sync mark from the reference radial location toward an inner diameter of the disk;
a second spiral track comprises the second sync mark from the outer diameter of the disk to the reference radial location and the first sync mark from the reference radial location toward the inner diameter of the disk; and
the first sync mark is different than the second sync mark;
a means for actuating the head over the disk; and
means for locating the reference radial location by detecting the first and second sync marks.

* * * * *